United States Patent [19]

Deerwester et al.

[11] Patent Number: 4,839,853
[45] Date of Patent: Jun. 13, 1989

[54] COMPUTER INFORMATION RETRIEVAL USING LATENT SEMANTIC STRUCTURE

[75] Inventors: Scott C. Deerwester, Chicago, Ill.; Susan T. Dumais, Berkeley Heights; George W. Furnas, Madison, both of N.J.; Richard A. Harshman, London, Canada; Thomas K. Landauer, Summit, N.J.; Karen E. Lochbaum, Chatham, N.J.; Lynn A. Streeter, Summit, N.J.

[73] Assignee: Bell Communications Research, Inc., Livingston, N.J.

[21] Appl. No.: 244,349

[22] Filed: Sep. 15, 1988

[51] Int. Cl.⁴ .......................................... G06F 15/40
[52] U.S. Cl. ................... 364/900; 364/200; 364/225.4; 364/963.1; 364/942.71
[58] Field of Search ............ 364/419, 224.1, 225.4, 364/253.1, 253.2, 253.3, 282.1, 282.3, 942.71, 942.76, 942.77, 956.1, 963.1, 200 MS File, 900 MS File

[56] References Cited

U.S. PATENT DOCUMENTS

| | | | |
|---|---|---|---|
| 4,384,325 | 5/1983 | Slechta | 364/200 |
| 4,433,392 | 2/1984 | Beaven | 364/200 |
| 4,495,566 | 1/1985 | Dickinson et al. | 364/200 |
| 4,506,326 | 3/1985 | Shaw et al. | 364/900 |
| 4,575,798 | 3/1986 | Lindstrom et al. | 364/900 |

*Primary Examiner*—Jerry Smith
*Assistant Examiner*—Steven G. Kibby
*Attorney, Agent, or Firm*—James W. Falk; John T. Peoples

[57] ABSTRACT

A methodology for retrieving textual data objects is disclosed. The information is treated in the statistical domain by presuming that there is an underlying, latent semantic structure in the usage of words in the data objects. Estimates to this latent structure are utilized to represent and retrieve objects. A user query is recouched in the new statistical domain and then processed in the computer system to extract the underlying meaning to respond to the query.

11 Claims, 2 Drawing Sheets

COMPUTER INFORMATION RETRIEVAL USING LATENT SEMANTIC STRUCTURE

FIELD OF THE INVENTION

This invention relates generally to computer-based information retrieval and, in particular, to user accessibility to and display of textual material stored in computer files.

BACKGROUND OF THE INVENTION

Increases in computer storage capacity, transmission rates and processing speed mean that many large and important collections of data are now available electronically, such as via bulletin boards, mail, and on-line texts, documents and directories. While many of the technological barriers to information access and display have been removed, the human/system interface problem of being able to locate what one really needs from the collections remains. Methods for storing, organizing and accessing this information range from electronic analogs of familiar paper-based techniques, such as tables of contents or indices to richer associative connections that are feasible only with computers, such as hypertext and full-context addressability. While these techniques may provide retrieval benefits over the prior paper-based techniques, many advantages of electronic storage are yet unrealized. Most systems still require a user or provider of information to specify explicit relationships and links between data objects or text objects, thereby making the systems tedious to use or to apply to large, heterogeneous computer information files whose content may be unfamiliar to the user.

To exemplify one standard approach whose difficulties and deficiencies are representative of conventional approaches, the retrieval of information using keyword matching is considered. This technique depends on matching individual words in a user's request with individual words in the total database of textual material. Text objects that contain one or more words in common with those in the user's query are returned as relevant. Keyword-based retrieval systems like this are, however, far from ideal. Many objects relevant to the query may be missed, and oftentimes unrelated objects are retrieved.

The fundamental deficiency of current information retrieval methods is that the words a searcher uses are often not the same as those by which the information sought has been indexed. There are actually two aspects to the problem. First, there is a tremendous diversity in the words people use to describe the same object or concept; this is called synonymy. Users in different contexts, or with different needs, knowledge or linguistic habits will describe the same information using different terms. For example, it has been demonstrated that any two people choose the same main keyword for a single, well-known object less than 20% of the time on average. Indeed, this variability is much greater than commonly believed and this places strict, low limits on the expected performance of word-matching systems.

The second aspect relates to polysemy, a word having more than one distinct meaning. In different contexts or when used by different people the same word takes on varying referential significance (e.g., "bank" in river bank versus "bank" in a savings bank). Thus the use of a term in a search query does not necessarily mean that a text object containing or labeled by the same term is of interest.

Because human word use is characterized by extensive synonymy and polysemy, straightforward term-matching schemes have serious shortcomings—relevant materials will be missed because different people describe the same topic using different words and, because the same word can have different meanings, irrelevant material will be retrieved. The basic problem may be simply summarized by stating that people want to access information based on meaning, but the words they select do not adequately express intended meaning. Previous attempts to improve standard word searching and overcome the diversity in human word usage have involved: restricting the allowable vocabulary and training intermediaries to generate indexing and search keys; hand-crafting thesauri to provide synonyms; or constructing explicit models of the relevant domain knowledge. Not only are these methods expert-labor intensive, but they are often not very successful.

SUMMARY OF THE INVENTION

These shortcomings as well as other deficiencies and limitations of information retrieval are obviated, in accordance with the present invention, by automatically constructing a semantic space for retrieval. This is effected by treating the unreliability of observed word-to-text object association data as a statistical problem. The basic postulate is that there is an underlying latent semantic structure in word usage data that is partially hidden or obscured by the variability of word choice. A statistical approach is utilized to estimate this latent structure and uncover the latent meaning. Words, the text objects and, later, user queries are processed to extract this underlying meaning and the new, latent semantic structure domain is then used to represent and retrieve information.

The organization and operation of this invention will be better understood from a consideration of the detailed description of the illustrative embodiment thereof, which follows, when taken in conjunction with the accompanying drawings.

DETAILED DESCRIPTION

Before discussing the principles and operational characteristics of this invention in detail, it is helpful to present a motivating example. This also aids in introducing terminology utilized later in the discussion.

Simple Example Illustrating the Method

The contents of Table 1 are used to illustrate how semantic structure analysis works and to point out the differences between this method and conventional keyword matching.

TABLE 1

Document Set Based on Titles c1: Human machine interface for Lab ABC computer applications
c2: A survey of user opinion of computer system response time
c3: The EPS user interface management system
c4: Systems and human systems engineering testing of EPS-2
c5: Relation of user-perceived response time to error measurement m1: The generation of random, binary, unordered trees
m2: The intersection graph of paths in trees
m3: Graph minors IV: Widths of trees and well-quasi-ordering
m4: Graph minors: A survey In this example, a file of text objects consists of nine titles of technical documents with titles c1–c5 concerned with human/computer interaction and titles m1–m4 concerned with mathematical graph theory. In Table 1, words occurring in more than one title are italicized. Using conventional keyword retrieval, if a user requested papers dealing with "human computer interaction", titles c1, c2, and c4 would be returned, since these titles contain at least one keyword from the user request. However, c3 and c5, while related to the query, would not be returned since they share no words in common with the request. It is now shown how latent semantic structure analysis treats this request to return titles c3 and c5.

Table 2 depicts the "term-by-document" matrix for the 9 technical document titles. Each cell entry, (i,j), is the frequency of occurrence of term i in document j. This basic term-by-document matrix or a mathematical transformation thereof is used as input to the statistical procedure described below.

TABLE 2

| TERMS | DOCUMENTS | | | | | | | | |
|---|---|---|---|---|---|---|---|---|---|
| | c1 | c2 | c3 | c4 | c5 | m1 | m2 | m3 | m4 |
| human | 1 | 0 | 0 | 1 | 0 | 0 | 0 | 0 | 0 |
| interface | 1 | 0 | 1 | 0 | 0 | 0 | 0 | 0 | 0 |
| computer | 1 | 1 | 0 | 0 | 0 | 0 | 0 | 0 | 0 |
| user | 0 | 1 | 1 | 0 | 1 | 0 | 0 | 0 | 0 |
| system | 0 | 1 | 1 | 2 | 0 | 0 | 0 | 0 | 0 |
| response | 0 | 1 | 0 | 0 | 1 | 0 | 0 | 0 | 0 |
| time | 0 | 1 | 0 | 0 | 1 | 0 | 0 | 0 | 0 |
| EPS | 0 | 0 | 1 | 1 | 0 | 0 | 0 | 0 | 0 |
| survey | 0 | 1 | 0 | 0 | 0 | 0 | 0 | 0 | 1 |
| tree | 0 | 0 | 0 | 0 | 0 | 1 | 1 | 1 | 0 |
| graph | 0 | 0 | 0 | 0 | 0 | 0 | 1 | 1 | 1 |
| minor | 0 | 0 | 0 | 0 | 0 | 0 | 0 | 1 | 1 |

Figure 1:
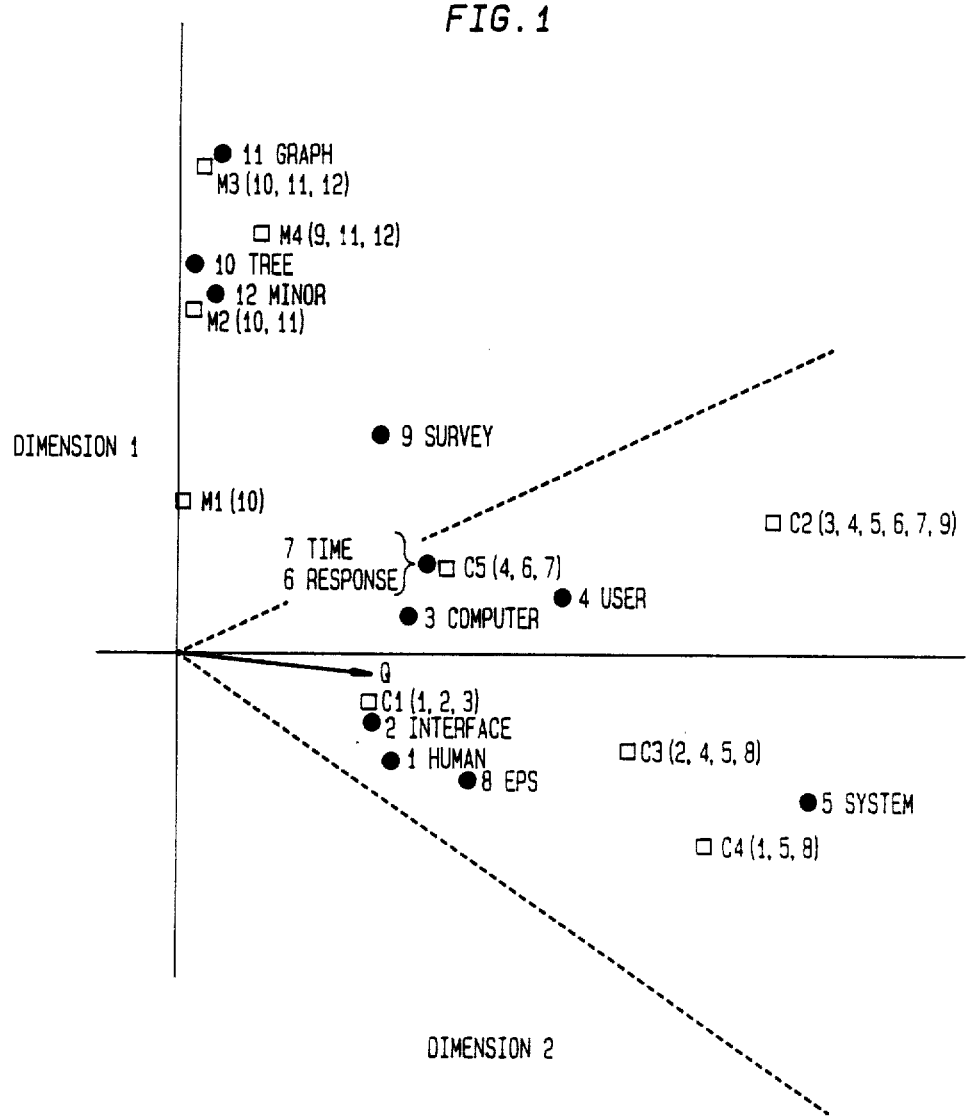
FIG. 1 is a plot of the "term" coordinates and the "document" coordinates based on a two-dimensional singular value decomposition of an original "term-by-document" matrix.

For this example the documents and terms have been carefully selected to yield a good approximation in just two dimensions for expository purposes. FIG. 1 is a two dimensional graphical representation of the two largest dimensions resulting from the statistical process, singular value decomposition. Both document titles and the terms used in them are fit into the same space. Terms are shown as circles and labeled by number. Document titles are represented by squares with the numbers of constituent terms indicated parenthetically. The cosine or dot product between two objects (terms or documents) describe their estimated similarity. In this representation, the two types of documents form two distinct groups: all the mathematical graph theory occupy the same region in space (basically along Dimension 1 of FIG. 1) whereas a quite distinct group is formed for human/computer interaction titles (essentially along Dimension 2 of FIG. 1).

To respond to a user query about "human computer interaction," the query is first folded into this two-dimensional space using those query terms that occur in the space (namely, "human" and "computer"). The query vector is located in the direction of the weighted average of these constituent terms, and is denoted by a directional arrow labeled "Q" in FIG. 1. A measure of closeness or similarity is related to the angle between the query vector and any given term or document vector. One such measure is the cosine between the query vector and a given term or document vector. In FIG. 1 the cosine between the query vector and each c1–c5 titles is greater than 0.90; the angle corresponding to the cosine value of 0.90 with the query is shown by the dashed lines in FIG. 1. With this technique, documents c3 and c5 would be returned as matches to the user query, even though they share no common terms with the query. This is because the latent semantic structure (represented in FIG. 1) fits the overall pattern of term usage across documents.

Description of Singular Value Decomposition

To obtain the data to plot FIG. 1, the "term-by-document" matrix of Table 2 is decomposed using singular value decomposition (SVD). A reduced SVD is employed to approximate the original matrix in terms of a much smaller number of orthogonal dimensions. This reduced SVD is used for retrieval; it describes major associational structures in the matrix but it ignores small variations in word usage. The number of dimensions to represent adequately a particular domain is largely an empirical matter. If the number of dimensions is too large, random noise or variations in word usage will be remodeled. If the number of dimensions is too small, significant semantic content will remain uncaptured. For diverse information sources, 100 or more dimensions may be needed.

To illustrate the decomposition technique, the term-by-document matrix, denoted Y, is decomposed into three other matrices, namely, the term matrix (TERM), the document matrix (DOCUMENT), and a diagonal matrix of singular values (DIAGONAL), as follows:

$$Y_{t,d} \text{TERM}_{t,m} \text{DIAGONAL}_{m,m} \text{DOCUMENT}^T\text{hd}_{m,d}$$

where Y is the original t-by-d matrix, TERM is the t-by-m DOCUMENT matrix with unit-length orthogonal columns, and DIAGONAL is the m-by-m diagonal matrix of singular values typically ordered by magnitude. The dimensionality of the full solution, denoted m, is the rank of the t-by-d matrix, that is, $m \leq \min(t,d)$. Tables 3, 4 and 5 below show the TERM and DOCUMENT matrices and the diagonal elements of the DIAGONAL matrix, respectively, as found via SVD.

TABLE 3

| TERM MATRIX (12 terms by 9 dimensions) | | | | | | | | | |
|---|---|---|---|---|---|---|---|---|---|
| human | 0.22 | −0.11 | 0.29 | −0.41 | −0.11 | −0.34 | −.52 | −0.06 | −0.41 |

TABLE 3-continued

TERM MATRIX (12 terms by 9 dimensions)

| interface | 0.20 | −0.07 | 0.14  | −0.55 | 0.28  | 0.50  | −0.07 | −0.01 | −0.11 |
|-----------|------|-------|-------|-------|-------|-------|-------|-------|-------|
| computer  | 0.24 | 0.04  | −0.16 | −0.59 | −0.11 | −0.25 | −0.30 | 0.06  | 0.49  |
| user      | 0.40 | 0.06  | −0.34 | 0.10  | 0.33  | 0.38  | 0.00  | 0.00  | 0.01  |
| system    | 0.64 | −0.17 | 0.36  | 0.33  | −0.16 | −0.21 | −0.16 | 0.03  | 0.27  |
| response  | 0.26 | 0.11  | −0.42 | 0.07  | 0.08  | −0.17 | 0.28  | −0.02 | −0.05 |
| time      | 0.26 | 0.11  | −0.42 | 0.07  | 0.08  | −0.17 | 0.28  | −0.02 | −0.05 |
| EPS       | 0.30 | −0.14 | 0.33  | 0.19  | 0.11  | 0.27  | 0.03  | −0.02 | −0.16 |
| survey    | 0.20 | 0.27  | −0.18 | −0.03 | −0.54 | 0.08  | −0.47 | −0.04 | −0.58 |
| tree      | 0.01 | 0.49  | 0.23  | 0.02  | 0.59  | −0.39 | −0.29 | 0.25  | −0.22 |
| graph     | 0.04 | 0.62  | 0.22  | 0.00  | −0.07 | 0.11  | 0.16  | −0.68 | 0.23  |
| minor     | 0.03 | 0.45  | 0.14  | −0.01 | −0.30 | 0.28  | 0.34  | 0.68  | 0.18  |

TABLE 4

DOCUMENT MATRIX (9 documents by 9 dimensions)

| c1 | 0.20 | −0.06 | 0.11  | −0.95 | 0.04  | −0.08 | 0.18  | −0.01 | −0.06 |
|----|------|-------|-------|-------|-------|-------|-------|-------|-------|
| c2 | 0.60 | 0.16  | −0.50 | −0.03 | −0.21 | −0.02 | −0.43 | 0.05  | 0.24  |
| c3 | 0.46 | −0.13 | 0.21  | 0.04  | 0.38  | 0.07  | −0.24 | 0.01  | 0.02  |
| c4 | 0.54 | −0.23 | 0.57  | 0.27  | −0.20 | −0.04 | 0.26  | −0.02 | −0.08 |
| c5 | 0.28 | 0.11  | −0.50 | 0.15  | 0.33  | 0.03  | 0.67  | −0.06 | −0.26 |
| m1 | 0.00 | 0.19  | 0.10  | 0.02  | 0.39  | −0.30 | −0.34 | 0.45  | −0.62 |
| m2 | 0.01 | 0.44  | 0.19  | 0.02  | 0.35  | −0.21 | −0.15 | −0.76 | 0.02  |
| m3 | 0.02 | 0.62  | 0.25  | 0.01  | 0.15  | 0.00  | 0.25  | 0.45  | 0.52  |
| m4 | 0.08 | 0.53  | 0.08  | −0.02 | −0.60 | 0.36  | 0.04  | −0.07 | −0.45 |

TABLE 5

DIAGONAL (9 singular values)

| 3.34 | 2.54 | 2.35 | 1.64 | 1.50 | 1.31 | 0.84 | 0.56 | 0.36 |
|------|------|------|------|------|------|------|------|------|

As alluded to earlier, data to plot FIG. 1 was obtained by presuming that two-dimensions are sufficient to capture the major associational structure of the t-by-d matrix, that is, m is set to two in the expression for $Y_{y,d}$, yielding an approximation of the original matrix. Only the first two columns of the TERM and DOCUMENT matrices are considered with the remaining columns being ignored. Thus, the term data point corresponding to "human" in FIG. 1 is plotted with coordinates (0.22,−0.11), which are extracted from the first row and the two left-most columns of the TERM matrix. Similarly, the document data point corresponding to title m1 has coordinates (0.00,0.19), coming from row six and the two left-most columns of the DOCUMENT matrix.

General Model Details

It is now elucidating to describe in somewhat more detail the mathematical model underlying the latent structure, singular value decomposition technique.

Any rectangular matrix Y of t rows and d columns, for examples, a t-by-d matrix of terms and documents, can be decomposed into a product of three other matrices:

$$Y = T_o S_o D_o^T,\qquad(1)$$

such that $T_o$ and $D_o$ have unit-length orthogonal columns (i.e. $T_o^T T_o = I; D_o^T D_o = I$) and $S_o$ is diagonal. This is called the singular value decomposition (SVD) of Y. (A procedure for SVD is described in the text *Numerical Recipes*, by Press, Flannery, Teukolsky and Vetterling, 1986, Cambridge University Press, Cambridge, England). $T_o$ and $D_o$ are the matrices of left and right singular vectors and $S_o$ is the diagonal matrix of singular values. By convention, the diagonal elements of $S_o$ are ordered in decreasing magnitude.

With SVD, it is possible to devise a simple strategy for an optimal approximation to Y using smaller matrices. The k largest singular values and their associated columns in $T_o$ and $D_o$ may be kept and the remaining entries set to zero. The product of the resulting matrices is a matrix $Y_R$ which is approximately equal to Y, and is of rank k. The new matrix $Y_R$ is the matrix of rank k which is the closest in the least squares sense to Y. Sine zeros were introduced into $S_o$, the representatin of $S_o$ can be simplified by deleting the rows and columns having these zeros to obtain a new diagonal matrix S, and then deleting the corresponding columns of $T_o$ and $D_o$ to define new matrices T and D, respectively. The result is a reduced model such that $$Y_R = TSD^T.\qquad(2)$$

The value of k is chosen for each application; it is generally such that $k \geq 100$ for collections of 1000-3000 data objects.

For discussion purposes, it is useful to interpret the SVD geometrically. The rows of the reduced matrices T and D may be taken as vectors representing the terms and documents, respectively, in a k-dimensional space. With appropriate rescaling of the axes, by quantities related to the associated diagonal values of S, dot products between points in the space can be used to access and compare objects. (A simplified approach which did not involve rescaling was used to plot the data of FIG. 1, but this was strictly for expository purposes.) These techniques are now discussed.

Fundamental Comparisons

There are basically three types of comparisons of interest: (i) those comparing two terms; (ii) those comparing two documents or text objects; and (iii) those comparing a term and a document or text object. As used throughout, the notion of a text object or data object is general whereas a document is a specific instance of a text object of data object. Also, text or data objects are stroed in the computer system in files.

Two Terms: In the data, the dot product between two row vectors of $Y_R$ tells the extent to which two terms have a similar pattern of occurrence across the set of documents. The matrix $Y_R Y^T_R$ is the square symmetric matrix approximation containing all the term-by-term dot products. Using equation (2), $$Y_R Y^T_R = (TSD^T)(TSD^T)^T = TS^2T^T = (TS)(TS)^T. \quad (3)$$

This means that the dot product between the i-th row and the j-th row of $Y_R$ can be obtained by calculating the dot product between the i-th and j-th rows of the TS matrix. That is, considering the rows of TS as vectors representing the terms, dot products between these vectors give the comparison between the terms. The relation between taking the rows of T as vectors and those of TS as vectors is simple since S is a diagonal matrix; each vector element has been stretched or shrunk by the corresponding element of S.

Two Documents: In this case, the dot product is between two column vectors of Y. The document-to-document dot product is approximated by $$Y^T_R Y_R = (TSD^T)^T(TSD^T) = DS^2D^T = (DS)(DS)^T. \quad (4)$$

Thus the rows of the DS matrix are taken as vectors representing the documents, and the comparison is via the dot product between the rows of the DS matrix.

Term and Document: This comparison is somewhat different. Instead of trying to estimate the dot product between rows or between columns of Y, the fundamental comparison between a term and a document is the value of an individual cell in Y. The approximation of Y is simply equation (2), i.e., $Y_R = TSD^T$. The i,j cell of $Y_R$ may therefore be obtained by taking the dot product between the i-th row of the matrix $TS^{\frac{1}{2}}$ and the j-th row of the matrix $DS^{\frac{1}{2}}$. While the "within" (term or document) comparisons involved using rows of TS and DS as vectors, the "between" comparison requires $TS^{\frac{1}{2}}$ and $DS^{\frac{1}{2}}$ for coordinates. Thus it is not possible to make a single configuration of points in a space that will allow both "between" and "within" comparisons. They will be similar, however, differing only by a stretching or shrinking of the dimensional elements by a factor $S^{\frac{1}{2}}$.

Representations of Pseudo-Objects

The previous results show how it is possible to compute comparisons between the various objects associated with the rows or columns of Y. It is very important in information retrieval applications to computer similar comparison quantities for objects such as queries that do not appear explicitly in Y. For example, it is necessary to be able to take a completely novel query, find a location in the k-dimensional latent semantic space for it, and then evaluate its cosine or inner product with respect to terms or objects in the space. Another example would be trying, after-the-fact, to find representations for documents that did not appear in the original space. The new objects for both these examples are equivalent to objects in the matrix Y in that they may be represented as vectors of terms. For this reason they are called pseudo-documents specifically or pseudo-objects generically. In order to compare pseudo-documents to other documents, the starting point is defining a pseudo-document vector, designated $Y_q$. Then a representation $D_q$ is derived such that $D_q$ can be used just like a row of D in the comparison relationships described in the foregoing sections. One criterion for such a derivation is that the insertion of a real document $Y_i$ should give $D_i$ when the model is ideal (i.e., $Y = Y_R$). With this constraint, $$Y_q = TSD_q^T$$

or, since $T^TT$ equals the identity matrix, $$D_q^T = S^{-1}T^TY_q$$

or, finally, $$D_q = Y^T_q TS^{-1}. \quad (5)$$

Thus, with appropriate rescaling of the axes, this amounts to placing the pseudo-object at the vector sum of its corresponding term points. Then $D_q$ may be used like any row of D and, appropriately scaled by S or $S^{\frac{1}{2}}$, can be used like a usual document vector for making "within" and "between" comparisons. It is to be noted that if the measure of similarity to be used in comparing the query against all the documents is one in which only the angle between the vectors is important (such as the cosine), there is no difference for comparison purposes between placing the query at the vector average or the vector sum of its terms.

Illustrative Embodiment

The foundation principles presented in the foregoing sections are now applied to a practical example of way of teaching an illustrative embodiment in accordance with the present invention.

The system under consideration is one that receives a request for technical information from a user and returns as a response display the most appropriate groups in a large, technically diverse company dealing with that technical information. The size of each group is from five to ten people. There is no expert who understands in detail what every group is accomplishing. Each person's understanding or knowledge of the company's technical work tends to be myopic, that is, each one knows their particular group's work, less about neighboring groups and their knowledge becomes less precise or even nonexistent as one moves further away from the core group.

If each group can be described by a set of terms, then the latent semantic indexing procedure can be applied. For instance, one set of textural descriptions might include annual write-ups each group member must prepare in describing the planned activity for the coming year. Another input could be the abstracts of technical memoranda written by members of each group.

Figure 2:
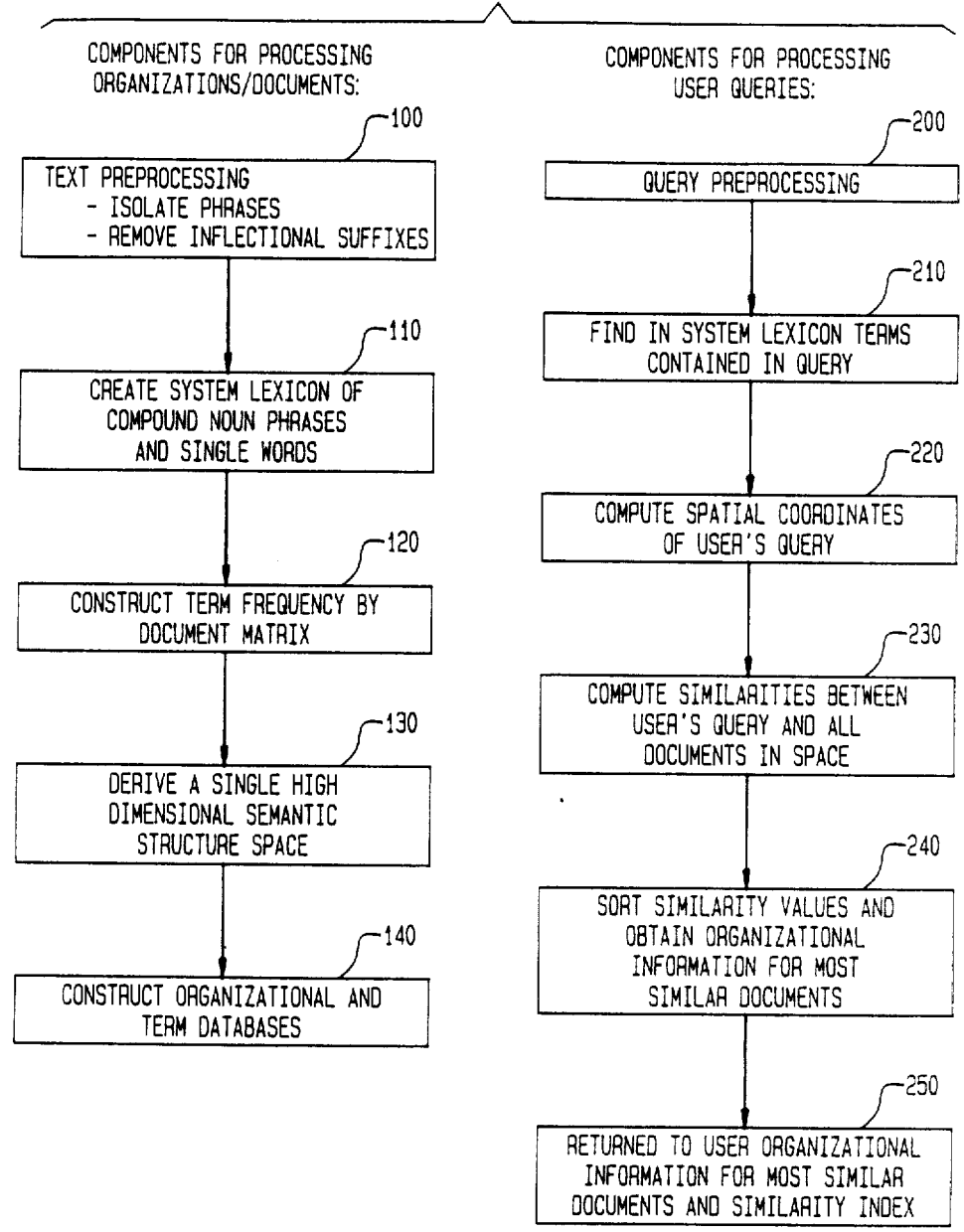
FIG. 2 is a flow diagram depicting the processing to generate the "term" and "document" matrices using singular value decomposition as well as the processing of a user's query.

The technique for processing the documents gathered together to represent the company technical information is shown in block diagram form in FIG. 2. The first processing activity, as illustrated by processing block 100, is that of text processing. All the combined text is preprocessed to identify terms and possible compound noun phrases. First, phrases are found by identifying all words between (1) a precompiled list of stop words; or (2) punctuation marks; or (3) parenthetical remarks.

To obtain more stable estimates of word frequencies, all inflectional suffixes (past tense, plurals, adverbials, progressive tense, and so forth) are removed from the words. Inflectional suffixes, in contrast to derivational suffixes, are those that do not usually change the meaning of the base word. (For example, removing the "s" from "boys" does not change the meaning of the base word whereas stripping "ation" from "information" does change the meaning). Since no single set of pattern-action rules can correctly describe English language, the suffix stripper sub-program may contain an exception list.

The next step to the processing is represented by block 110 in FIG. 2. Based upon the earlier text preprocessing, a system lexicon is created. The lexicon includes both single word and noun phases. The noun phrases provide for a richer semantic space. For example, the "information" in "information retrieval" and "information theory" have different meanings. Treating these as separate terms places each of the compounds at different places in the k-dimensional space. (for a word in radically different semantic environments, treating it as a single word tends to place the word in a meaningless place in k-dimensional space, whereas treating each of its different semantic environments separately using separate compounds yields spatial differentiation).

Compound noun phrases may be extracted using a simplified, automatic procedure. First, phrases are found using the "pseudo" parsing technique described with respect to step 100. Then all left and right branching subphrases are found. Any phrase or subphrase that occurs in more than one document is a potential compound phrase. Compound phrases may range from two to many words (e.g., "semi-insulating Fe-doped InP current blocking layer"). From these potential compound phrases, all longest-matching phrases as well as single words making up the compounds are entered into the lexicon base to obtain spatial separation.

In the illustrative embodiment, all inflectionally stripped single words occurring in more than one document and that are not on the list of most frequently used words in English (such as "the", "and") are also included in the system lexicon. Typically, the exclusion list comprises about 150 common words.

From the list of lexicon terms, the Term-by-Document matrix is created, as depicted by processing block 120 in FIG. 2. In one exemplary situation, the matrix contained 7100 terms and 728 documents representing 480 groups.

The next step is to perform the singular value decomposition on the Term-by-Document matrix, as depicted by processing block 130. This analysis is only effected once (or each time there is a significant update in the storage files).

The last step in processing the documents prior to a user query is depicted by block 140. In order to relate a selected document to the group responsible for that document, an organizational database is constructed. This latter database may contain, for instance, the group manager's name and the manager's mail address.

The user query processing activity is depicted on the right-hand side of FIG. 2. The first step, as represented by processing block 200, is to preprocess the query in the same way as the original documents.

As then depicted by block 210 the longest matching compound phrases as well as single words not part of compound phrases are extracted from the query. For each query term also contained in the system lexicon, the k-dimensional vector is located. The query vector is the weighted vector average of the k-dimensional vectors. Processing block 220 depicts the generation step for the query vector.

The next step in the query processing is depicted by processing block 230. In order that the best matching document is located, the query vector is compared to all documents in the space. The similarity metric used is the cosine between the query vector and the document vectors. A cosine of 1.0 would indicate that the query vector and the document vector were on top of one another in the space. The cosine metric is similar to a dot product measure except that it ignores the magnitude of the vectors and simply uses the angle between the vectors being compared.

The cosines are sorted, as depicted by processing block 240, and for each of the best N matching documents (typically N=8), the value of the cosine along with organizational information corresponding to the document's group are displayed to the user, as depicted by processing block 250. Table 6 shows a typical input and output for N=5.

TABLE 6

| INPUT QUERY: | An Expert/Expert-Locating System Based on Automatic Representation of Semantic Structure | |
|---|---|---|
| OUTPUT RESULTS: | | |
| | 1. Group:B | |
| | Group Title: | Artificial Intelligence and Information Science Research |
| | Group Manager: | D. E. Walker, Address B, Phone B |
| | Fit (Cosine): | 0.67 |
| | 2. Group: A | |
| | Group Title: | Artificial Intelligence and Communications Research |
| | Group Manager: | L. A. Streeter, Address A, Phone A |
| | Fit (Cosine): | 0.64 |
| | 3. Group: E | |
| | Group Title: | Cognitive Science Research |
| | Group Manager: | T. K. Laudauer, Address E, Phone E |
| | Fit (Cosine): | 0.63 |
| | 4. Group:C | |
| | Group Title: | Experimental Systems |
| | Group Manager: | C. A. Riley, Address C, Phone C |
| | Fit (Cosine): | 0.62 |
| | 5. Group: D | |
| | Group Title: | Software Technology |
| | Group Manager: | C. P. Lewis, Address D, Phone D |
| | Fit (Cosine): | 0.55 |

It is to be further understood that the methodology described herein is not limited to the specific forms disclosed by way of illustration, but may assume other embodiments limited only by the scope of the appended claims.

What is claimed is:

1. An information retrieval method comprising the steps of
    generating term-by-data object matrix data to represent information files stored in a computer system, said matrix data being indicative of the frequency of occurrence of selected terms contained in the data objects stored in the information files,
    decomposing said matrix into a reduced singular value representation composed of distinct term and data object files,
    in response to a user query, generating a pseudo-object utilizing said selected terms and inserting said pseudo-object into said matrix data, and
    examining the similarity between said pseudo-object and said term and data object files to generate an information response and storing said response in the system in a form accessible by the user.

2. The method as recited in claim 1 wherein said step of generating said matrix data includes the step of producing a lexicon database defining said selected terms.

3. The method as recited in claim 2 wherein said step of producing said lexicon database includes the step of parsing the data objects.

4. The method as recited in claim 3 wherein said step of parsing includes the steps of removing inflectional suffixes and isolating phrases in the data objects.

5. The method as recited in claim 2 wherein said step of generating said pseudo-object includes the step of parsing said pseudo-object with reference to said lexicon database.

6. The method as recited in claim 1 further including the step of generating an organizational database associated with the authorship of the data objects and storing said organizational database in the system and said response includes information from said organizational database based on said similarity.

7. The method as recited in claim 1 wherein
    said matrix database is expressed as Y,
    said step of decomposing produces said representation in the form $Y = T_o S_o D^T_o$ of rank m, and an approximation representation $Y_R = TSD^T$ of rank $k < m$, where $T_o$ and $D_o$ represent said term and data object databases and $S_o$ corresponds to said singular value representation and where T, D and S represent reduced forms of $T_o$, $D_o$ and $S_o$, respectively,
    said pseudo-object is expressible as $Y_q$ and said step of inserting includes the step of computing $D_q = Y_q^T TS^{-1}$, and
    said step of examining includes the step of evaluating the dot products between said pseudo-object and said term and document matrices.

8. The method as recited in claim 7 wherein the degree of similarity is measured by said dot products exceeding a predetermined threshold.

9. The method as recited in claim 8 wherein said approximation representation is obtained by setting (k+1) through m diagonal values of $S_o$ to zero.

10. The method as recited in claim 1 wherein
    said matrix database is expressed as Y,
    said step of decomposing produces said representation in the form $Y = T_o S_o D^T_o$ of rank m, and an approximation representation $Y_R = TSD^T$ of rank $k < m$, where $T_o$ and $D_o$ represent said term and data object databases and $S_o$ corresponds to said singular value representation and where T, D and S represent reduced forms of $T_o$, $D_o$ and $S_o$, respectively,
    said pseudo-object is expressible as $Y_q$ and said step of inserting includes the step of computing $D_q = Y_q^T TS^{-1}$, and
    said step of examining includes the step of evaluating the cosines between said pseudo-object and said term and document matrices.

11. A method for retrieving information from an information file stored in a computer system comprising the steps of
    generating term-by-data object matrix data by processing the information file,
    performing a singular value decomposition on said matrix data to obtain the reduced term and data object vectors and diagonal values,
    in response to a user query, generating a pseudo-object vector and augmenting said matrix data with said pseudo-vector using reduced forms of said term vector and said diagonal values and storing said augmented data in the system, and
    examining the similarities between said pseudo-object vector and said reduced term vector and a reduced form of said data object vector to generate the information and storing the information in a response file accessible to the user.

* * * * *

UNITED STATES PATENT AND TRADEMARK OFFICE
CERTIFICATE OF CORRECTION

PATENT NO. : 4,839,853

DATED : June 13, 1989

INVENTOR(S) : Deerwester-Dumais-Furnas-Harshman-Landauer-Lochbaum-Streeter

It is certified that error appears in the above-identified patent and that said Letters Patent is hereby corrected as shown below:

Column 4, line 42, change "remodeled" to --modeled--;

Column 4, lines 52-53, change the following equation:

$$"Y_{t,d} TERM_{t,m} DIAGONAL_{m,m} DOCUMENT^T hd\ m,d"$$

to read as follows:

$$--Y_{t,d} = TERM_{t,m} DIAGONAL_{m,m} DOCUMENT^T_{m,d} --;$$

Column 4, line 56, after "t-by-m" insert --matrix that has unit-length orthogonal columns, $DOCUMENT^T$ is the transpose of the d-by-m--.

Column 5, line 33, change "$Y_{y,d}$" to --$Y_{t,d}$--.

Column 6, line 32, change "Sine" to --Since--;

Column 6, line 33, change "representatin" to --representation--;

Column 6, line 64, change "object of" to --object or--;

Column 6, line 65, change "stroed" to --stored--.

Column 8, line 54, change "processing" to --preprocessing--.

Column 9, line 12, change "(for" to --(For--.

UNITED STATES PATENT AND TRADEMARK OFFICE
CERTIFICATE OF CORRECTION

PATENT NO. : 4,839,853

DATED : June 13, 1989

INVENTOR(S) : Deerwester, et al

It is certified that error appears in the above-identified patent and that said Letters Patent is hereby corrected as shown below:

Column 11, lines 46-47, change "respectively." to --respectively,--

Signed and Sealed this

Twenty-second Day of December, 1992

Attest:

DOUGLAS B. COMER

*Attesting Officer*        *Acting Commissioner of Patents and Trademarks*